(12) United States Patent
Tamai

(10) Patent No.: US 7,109,610 B2
(45) Date of Patent: Sep. 19, 2006

(54) INTEGRATED WIRELESS LINEAR MOTOR

(75) Inventor: Hirofumi Tamai, Osaka-Fu (JP)

(73) Assignee: Muscle Corporation, Osaka (JP)

( * ) Notice: Subject to any disclaimer, the term of this patent is extended or adjusted under 35 U.S.C. 154(b) by 78 days.

(21) Appl. No.: 10/777,209

(22) Filed: Feb. 13, 2004

(65) Prior Publication Data

US 2004/0227412 A1 Nov. 18, 2004

(30) Foreign Application Priority Data

Mar. 17, 2003 (CA) ................................. 2422341

(51) Int. Cl.
H02K 41/00 (2006.01)

(52) U.S. Cl. .......................................... 310/12; 310/13

(58) Field of Classification Search .................. 310/12, 310/13, 14; 318/135
See application file for complete search history.

(56) References Cited

U.S. PATENT DOCUMENTS

| | | |
|---|---|---|
| 3,934,183 A | 1/1976 | Saufferer |
| 4,151,447 A | 4/1979 | von der Heide et al. |
| 4,369,383 A | 1/1983 | Langley |
| 4,560,911 A | 12/1985 | Chitayat |
| 4,583,028 A | 4/1986 | Angersbach |
| 4,641,065 A | 2/1987 | Shibuki |
| 4,733,143 A | 3/1988 | Chitayat |
| 4,749,921 A | 6/1988 | Chitayat |
| 4,761,573 A | 8/1988 | Chitayat |
| 4,789,815 A | 12/1988 | Kobayashi et al. |
| 5,317,245 A | 5/1994 | Moritz et al. |
| 5,606,256 A | 2/1997 | Takei |
| 5,723,917 A | 3/1998 | Chitayat |
| 5,773,941 A | 6/1998 | Moritz et al. |
| 5,907,200 A | 5/1999 | Chitayat |
| 5,920,164 A | 7/1999 | Moritz et al. |
| 5,925,943 A | 7/1999 | Chitayat |
| 5,936,319 A | 8/1999 | Chitayat |
| 5,942,817 A | 8/1999 | Chitayat |
| 5,949,161 A | 9/1999 | Nanba |
| 5,965,963 A | 10/1999 | Chitayat |
| 5,977,664 A | 11/1999 | Chitayat |
| 5,994,798 A | 11/1999 | Chitayat |
| 5,995,884 A | 11/1999 | Allen et al. |
| 6,005,310 A | 12/1999 | Mosciatti et al. |
| 6,054,831 A | 4/2000 | Moore et al. |

(Continued)

OTHER PUBLICATIONS

Selection from the Web site of Anorad Corporation (http://www.anorad.com) printed May 10, 2002.

Primary Examiner—Darren Schuberg
Assistant Examiner—Erik Preston
(74) Attorney, Agent, or Firm—Dowell & Dowell, P.C.

(57) ABSTRACT

A wireless linear motor comprising: a stationary stator having permanent magnets; a movable stage having coils and a controller with a transceiver for wirelessly communicating with an external data processing system, the controller adapted to energize the coils to position the stage over the stator in response to control signals from the external system; and, a frame having first and second electrically conductive linear guides for slideably mounting the stage over the stator, wherein each linear guide has a stage portion attached to the stage through a first electrical insulator, a frame portion attached to the frame through a second electrical insulator, a plurality of ball bearings disposed between and electrically coupling the stage and frame portions, and a conductor coupling the stage portion to the controller for providing electrical power from an external power supply to the controller through the frame portion of each guide.

9 Claims, 7 Drawing Sheets

U.S. PATENT DOCUMENTS

| | | |
|---|---|---|
| 6,106,576 A | 8/2000 | Fromson |
| 6,274,952 B1 | 8/2001 | Chilayat et al. |
| 6,326,754 B1 | 12/2001 | Mullet et al. |
| 6,333,628 B1 * | 12/2001 | Yeh et al. ............... 324/207.24 |
| 6,441,515 B1 * | 8/2002 | Shimura ...................... 310/12 |
| 6,508,591 B1 * | 1/2003 | Niwa et al. .................. 384/492 |
| 6,712,512 B1 * | 3/2004 | Teramach et al. ............. 384/45 |
| 2003/0083685 A1 * | 5/2003 | Freeman et al. ............ 606/181 |

* cited by examiner

INTEGRATED WIRELESS LINEAR MOTOR

This application claims priority from Canadian Patent Application No. 2,422,341, filed Mar. 17, 2003, and incorporated herein by reference.

FIELD OF THE INVENTION

The invention relates to the field of linear motors, and more specifically to linear motors without power or control wiring between stator and movable stage.

BACKGROUND OF THE INVENTION

Linear motors having stationary armatures containing coils and movable stages containing magnets are well known in the art. Also known are linear motors having stationary magnets and moving coils. One type of such linear motors is disclosed in U.S. Pat. No. 4,749,921 to Chitayat. The linear motor disclosed in this patent has a series of armature windings mounted to a base plate and a stage having a series of magnets that is free to move on the base plate. The stage is urged in the desired direction by applying AC or DC excitation to the coils. When such a linear motor is used in a positioning system, the relationship between the location of the stage and locations of the coils must be accounted for. In another linear motor, commutator contacts are pendant from the stage. The contacts contact one or more power rails, and one or more coil contacts. As the stage moves along the armature, the location of the stage, relative to the armature is automatically accounted for by applying power to the stationary armature windings through the commutator contacts. In yet other linear motors, it is conventional to employ a service loop of wires between the moving stage and the stationary elements.

Typically, the location of the stage is updated using a magnetic or optical position encoder on the stage which senses markings on an encoder tape stationary alongside the path of the stage. The location is transferred by the service loop to a stationary motor controller. Generally, the important location information is the phase of the stage relative to the phase of the armature. For example, in a three-phase armature, the windings are disposed in repeating sets of three for phases U, V and W. If the center of the U phase winding is arbitrarily defined as 0 degrees, then the centers of the V and W windings are defined as 120 and 240 degrees. There may be two, three or more sets of windings as required for the travel distance of the stage. Normally, all U phase windings are connected in parallel. The same is true of all V and W phase windings. Thus, when the location of the stage requires a certain voltage configuration on the particular windings within the influence of the magnets on the stage, besides powering these windings, all of the other windings in the armature are also powered. The maximum force obtainable from a linear motor is limited by the allowable temperature rise in the armature windings. When all windings are powered, whether they contribute to motor force or not, more armature heating occurs than is strictly necessary for performing the motor functions. Some linear motors in the prior art have responded to this heating problem using switches that are closed only to the armature windings actually within the influence of the magnets.

For reference, FIG. 1 is a side view of a linear motor 100 in accordance with the prior art. The linear motor 100 includes a stage (or mover) 110 and a stator 120. The stage (here, the armature) 110 includes coils 130 and the stator (here, the field) 120 includes magnets 140. The linear motor 100 is controlled by an external driver/controller 150 that is connected to the linear motor 100 by umbilical wires 190. The umbilical wires 190 include: three wires for U, V, and W signals 160 from the stage 110; five wires for power, ground, and U, V and W signals from the Hall Effect sensor 170; and, five wires for power, ground, and A, B and Z signals from the position sensor 180 on the stage 110. The Hall Effect sensor 170 is used for detecting magnetic poles for commutation purposes.

Now, linear motors are increasingly being employed in manufacturing equipment. In such equipment, nominal increases in the speed of operation translate into significant savings in the cost of production. It is particularly desirable to produce as much force and acceleration as possible in a given linear motor. An increase in force generated requires either an increase in magnetic field intensity or an increase in current applied to coils of the armature. In a permanent magnet linear motor, the available magnetic field intensity is limited by the field strength of available motor magnets. Power dissipated in the coils increases at a rate equal the square of the current. Attendant heat generation limits the force that may be achieved without exceeding the maximum armature temperature. Therefore, improvements in the power dissipation capacity of linear motors provide for increases in their utility.

In typical manufacturing equipment, a linear motor may be employed for driving a positioning table along an axis. For example, positioning tables are commonly used for moving a work object such as an electronic device in a precise path for performing an operation or inspection on the work object. Desirable characteristics of such positioning tables include precision, compactness, the maximum speed at which the table can be driven and the accuracy with which the table may be positioned. U.S. Pat. No. 4,151,447 to von der Heide, et al., discloses a linear DC motor having rows of pairs of vertically standing permanent magnets between which flat coils are arranged to travel. The polarity of DC power to the flat coils is switched by a magnetic field or electro-optical sensor at predetermined points in the travel of the flat coils. The apparatus in this patent employs trailing cables for feeding power to the coils.

U.S. Pat. No. 4,761,573 to Chitayat discloses a linear DC motor suitable for driving a positioning table. This linear DC motor includes a linear toothed structure including coils wound around the individual teeth to form a repeating line pattern of electrically produced magnetic poles facing a corresponding parallel array of magnets arranged with alternating magnetic polarity having their broad faces closest to the toothed assembly. A brush assembly is provided on the movable element for contacting a linear slip ring assembly on the stationary element for switching the polarity of voltage applied to energizing coils of the motor. Linear power pickup rails are used in conjunction with brushes and linear slip rings for feeding and controlling power to energizing coils. Furthermore, a brush and power pickup brush assembly is disclosed for feeding first and second electrical polarities to energizing coils which employs two identical comb-like structures for both picking up power from linear power pickup rails and for feeding power to the coils through a linear slip ring.

Another brush and rail power pick-up arrangement is disclosed in U.S. Pat. No. 4,789,815 to Kobayashi, et al. This patent discloses a movable stage having control and driver means for supplying electric power to coils in the movable stage. The electric power is delivered to the control and driver means through brushes which make contact with rails mounted on the frame. The direction and position of the movable stage are controlled through the supply of power to the rails (i.e. on, off, and polarity). The linear motor thus disclosed is directed toward the control of curtains in vehicles.

Thus, there is a growing commercial use of high performance, linear motors in various manufacturing and other applications. One recognized disadvantage of prior art linear motors is the cumbersome umbilical wires that connect the moving armature or stage to the controller and power source. For example, the umbilical for a prior art three-phase, brushless motor may have three power lines, five signal lines for the armature commutating signals, and eight signal lines for armature position signals. The need for a cable loop connecting moving and stationary elements is inconvenient and limits the flexibility with which a system can be designed. The wiring harness requires additional clearance from the linear motor to prevent entanglement between the motor and any equipment or items that may be adjacent to the linear motor path. In addition, the wiring harness adds additional weight to the moving element of the linear motor. Furthermore, manufacturing of a linear motor employing a wiring harness incurs additional cost of material and assembly labour. Therefore, it would be desirable to eliminate the use of a wiring harness in a linear motor to decrease the cost of assembly, decrease the overall weight of the moving element, and to eliminate the clearance restrictions on the linear motor's utility. Another recognized disadvantage is the need to remove heat from the moving stage (i.e. armature). Where a coolant is used, the umbilical includes, in addition to the wires, a tube to carry the coolant to a coolant coil embedded in the armature and a tube to carry the coolant from the coil. The result is a heavy, cumbersome, umbilical of wires and tubes, festooned along the path over which the stage moves.

To overcome some of these disadvantages, wireless or semi-wireless linear motors have been developed and have been disclosed, for example, in U.S. Pat. Nos. 5,936,319 to Chitayat and 6,005,310 to Mosciatti, et al. U.S. Pat. No. 5,936,319 discloses a communications device on a movable stage which wirelessly informs a motor controller about the position and/or incremental motion of the movable stage. The movable stage includes a position encoder and any wireless transmission system may be used including radio and infrared. However, the movable stage includes permanent magnets while the fixed path includes armature coils. U.S. Pat. No. 6,005,310 discloses a movable stage with a wireless transmitter (e.g. radio frequency or infrared) for transmitting commutating and position signals to an external motor controller. However, while the movable stage includes coils, the motor controller is connected to the movable stage by an umbilical cord.

A need therefore exists for an improved wireless linear motor which overcomes at least some of the drawbacks of the prior art. Accordingly, it is an object of the present invention to provide such a linear motor.

SUMMARY OF THE INVENTION

According to one aspect of the invention, there is provided a wireless linear motor comprising: a stationary stator having permanent magnets; a movable stage having coils and a controller with a transceiver for wirelessly communicating with an external data processing system, the controller adapted to energize the coils to position the stage over the stator in response to control signals from the external system; and, a frame having first and second electrically conductive linear guides for slideably mounting the stage over the stator, wherein each linear guide has a stage portion attached to the stage through a first electrical insulator, a frame portion attached to the frame through a second electrical insulator, a plurality of ball bearings disposed between and electrically coupling the stage and frame portions, and a conductor coupling the stage portion to the controller for providing electrical power from an external power supply to the controller through the frame portion of each guide.

Preferably, the stator is incorporated in the frame. Preferably, a linear recess is defined in the stage portion for receiving the frame portion. Preferably, the wireless linear motor further includes position sensors coupled to the controller for providing position signals for the stage to the external system for generating the control signals. Preferably, the wireless linear motor further includes magnetic sensors mounted on the stage and coupled to the controller for providing magnetic pole signals indicative of the location of the stage relative to the permanent magnets of the stator. Preferably, the magnetic sensors are Hall Effect sensors. Preferably, the wireless linear motor further includes a battery mounted on the stage and coupled to the controller for delivering supplemental power to the controller.

According to another aspect of the invention, there is provided a wireless linear motor comprising: a stationary stator having permanent magnets; a movable stage having coils and a controller with a transceiver for wirelessly communicating with an external data processing system, the controller adapted to energize the coils to position the stage over the stator in response to control signals from the external system; and, a frame having first and second magnetically permeable linear guides for slideably mounting the stage over the stator to form a magnetic circuit linking the frame and stage, wherein each linear guide has a stage portion attached to the stage and wound with a stage coil, a frame portion attached to the frame and wound with a frame coil, a plurality of ball bearings disposed between and magnetically coupling the stage and frame portions, electric conductors coupling the frame coil to an external power supply for generating a magnetic flux in the frame portion, and electric conductors coupling the stage coil to the controller for providing electrical power induced in the stage coil by the magnetic flux.

Preferably, the stator is incorporated in the frame. Preferably, a linear recess is defined in the stage portion for receiving the frame portion. Preferably, the wireless linear motor further includes position sensors coupled to the controller for providing position signals for the stage to the external system for generating the control signals. Preferably, the wireless linear motor further includes magnetic sensors mounted on the stage and coupled to the controller for providing magnetic pole signals indicative of the location of the stage relative to the permanent magnets of the stator. Preferably, the magnetic sensors are Hall Effect sensors. Preferably, the wireless linear motor further includes a battery mounted on the stage and coupled to the controller for delivering supplemental power to the controller.

According to another aspect of the invention, there is provided a wireless linear motor comprising: a stationary stator having permanent magnets; a movable stage having coils and a controller with a transceiver for wirelessly communicating with an external data processing system, the controller adapted to energize the coils to position the stage over the stator in response to control signals from the external system; and, a frame having first and second electrically conductive linear guides for slideably mounting the stage over the stator, wherein each linear guide has a stage portion attached to the stage through a first electrical insulator, a frame portion attached to the frame through a second electrical insulator, a plurality of ball bearings disposed between and electrically coupling the stage and frame portions, a brush mounted on the stage portion and contacting the frame portion, and a conductor coupling the brush to the controller for providing electrical power from an external power supply to the controller through the frame portion of each guide.

Preferably, the stator is incorporated in the frame. Preferably, a linear recess is defined in the stage portion for receiving the frame portion. Preferably, the wireless linear motor further includes position sensors coupled to the controller for providing position signals for the stage to the external system for generating the control signals. Preferably, the wireless linear motor further includes magnetic sensors mounted on the stage and coupled to the controller for providing magnetic pole signals indicative of the location of the stage relative to the permanent magnets of the stator. Preferably, the magnetic sensors are Hall Effect sensors. Preferably, the wireless linear motor further includes a battery mounted on the stage and coupled to the controller for delivering supplemental power to the controller. Preferably, the brush is spring mounted on the stage.

According to another aspect of the invention, there is provided a power supply circuit for a linear motor, the motor having a stationary stator including permanent magnets, a movable stage including coils and a controller for communicating with an external data processing system and adapted to energize the coils to position the movable stage over the stationary stator in response to control signals from the external system, the circuit comprising: first and second electrically conductive linear guides mounted on a frame and for slideably mounting the stage over the stator, wherein each linear guide has a stage portion attached to the stage through a first electrical insulator, a frame portion attached to the frame through a second electrical insulator, a plurality of ball bearings disposed between and electrically coupling the stage and frame portions, and a conductor coupling the stage portion to the controller for providing electrical power from an external power supply to the controller through the frame portion of each guide. Preferably, the power supply circuit further includes a battery mounted on the stage and coupled to the controller for delivering supplemental power to the controller.

According to another aspect of the invention, there is provided a power supply circuit for a linear motor, the motor having a stationary stator including permanent magnets, a movable stage including coils and a controller for communicating with an external data processing system and adapted to energize the coils to position the movable stage over the stationary stator in response to control signals from the external system, the circuit comprising: first and second magnetically permeable linear guides mounted on a frame and for slideably mounting the stage over the stator to form a magnetic circuit linking the frame and stage, wherein each linear guide has a stage portion attached to the stage and wound with a stage coil, a frame portion attached to the frame and wound with a frame coil, a plurality of ball bearings disposed between and magnetically coupling the stage and frame portions, electric conductors coupling the frame coil to an external power supply for generating a magnetic flux in the frame portion, and electric conductors coupling the stage coil to the controller for providing electrical power induced in the stage coil by the magnetic flux. Preferably, the power supply circuit further includes a battery mounted on the stage and coupled to the controller for delivering supplemental power to the controller.

According to another aspect of the invention, there is provided a power supply circuit for a linear motor, the motor having a stationary stator including permanent magnets, a movable stage including coils and a controller for communicating with an external data processing system and adapted to energize the coils to position the movable stage over the stationary stator in response to control signals from the external system, the circuit comprising: first and second electrically conductive linear guides mounted on a frame and for slideably mounting the stage over the stator, wherein each linear guide has a stage portion attached to the stage through a first electrical insulator, a frame portion attached to the frame through a second electrical insulator, a plurality of ball bearings disposed between and electrically coupling the stage and frame portions, a brush mounted on the stage portion and contacting the frame portion, and a conductor coupling the brush to the controller for providing electrical power from an external power supply to the controller through the frame portion of each guide. Preferably, the brush is spring mounted on the stage. Preferably, the power supply circuit further includes a battery mounted on the stage and coupled to the controller for delivering supplemental power to the controller.

Advantageously, no umbilical wires are used to connect the stage or controller to the frame or data processing system. In addition, the linear guides facilitate effective heat dissipation from the stage while providing improved power transfer to the stage.

BRIEF DESCRIPTION OF THE DRAWINGS

Embodiments of the invention may best be understood by referring to the following description and accompanying drawings. In the description and drawings, like numerals refer to like structures or processes. In the drawings.

DETAILED DESCRIPTION OF THE PREFERRED EMBODIMENTS

In the following description, numerous specific details are set forth to provide a thorough understanding of the invention. However, it is understood that the invention may be practiced without these specific details. In other instances, well-known software, circuits, structures and techniques have not been described or shown in detail in order not to obscure the invention. The term "data processing system" is used herein to refer to any machine for processing data, including the computer systems and network arrangements described herein.

Figure 1:
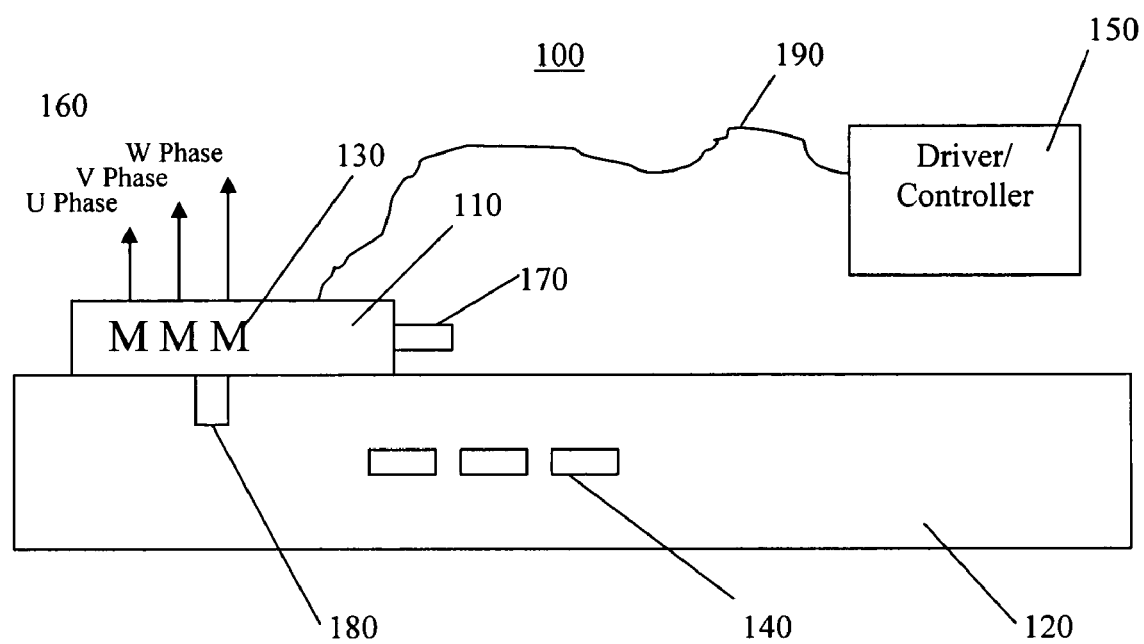
FIG. 1 is a side view of a linear motor in accordance with the prior art.
Figure 2:
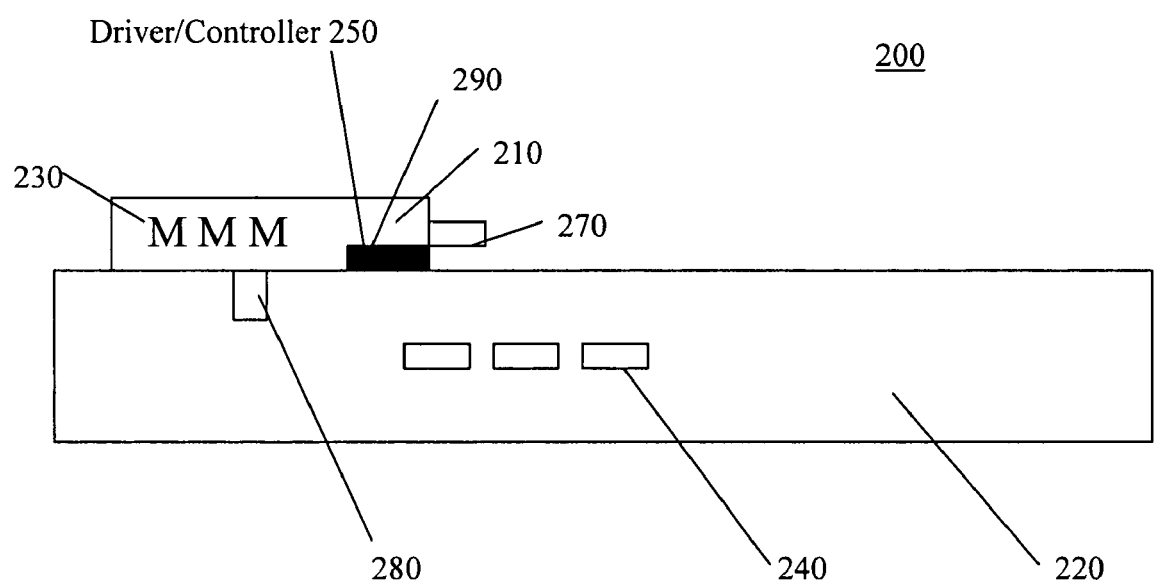
FIG. 2 is a side view of an integrated linear motor in accordance with an embodiment of the invention.

FIG. 2 is a side view of an integrated linear motor 200 in accordance with an embodiment of the invention. The integrated linear motor 200 includes a stage 210 slideably mounted over a stator 220. The stage 210 includes coils 230 and the stator 220 includes permanent magnets 240. The stage 210 is adapted to move back and forth over the stator 220 which may be incorporated in or form a frame 220 for the motor 200. The stage 210 is mechanically supported on the frame 220 by linear guides 510, 520 (see FIG. 5). The stage 210 may also be supported on the frame 220 by similar structures.

The linear motor 200 is controlled by a driver/controller 250 that is mounted on the stage 210. The driver/controller 250 includes a central processing unit or CPU, memory, a transceiver or transceiver interface, and I/O interfaces. The CPU may include dedicated coprocessors and memory devices. The memory may include RAM, ROM, databases, or disk devices. The transceiver or transceiver interface may include radio frequency, infrared, and power-line carrier transceivers or transceiver interfaces, respectively. And, the I/O interfaces may include interfaces for sensor inputs and coil outputs. In addition, the drive/controller 250 may support detachable input and display devices. The detachable input device may include a keyboard, mouse, trackball, or similar device. The detachable display may include a computer screen or terminal device. The driver/controller 250 has stored therein data representing sequences of instructions which when executed cause the operations described herein to be performed. Of course, the driver/controller 250 may contain additional software and hardware a description of which is not necessary for understanding the invention.

Figure 3:
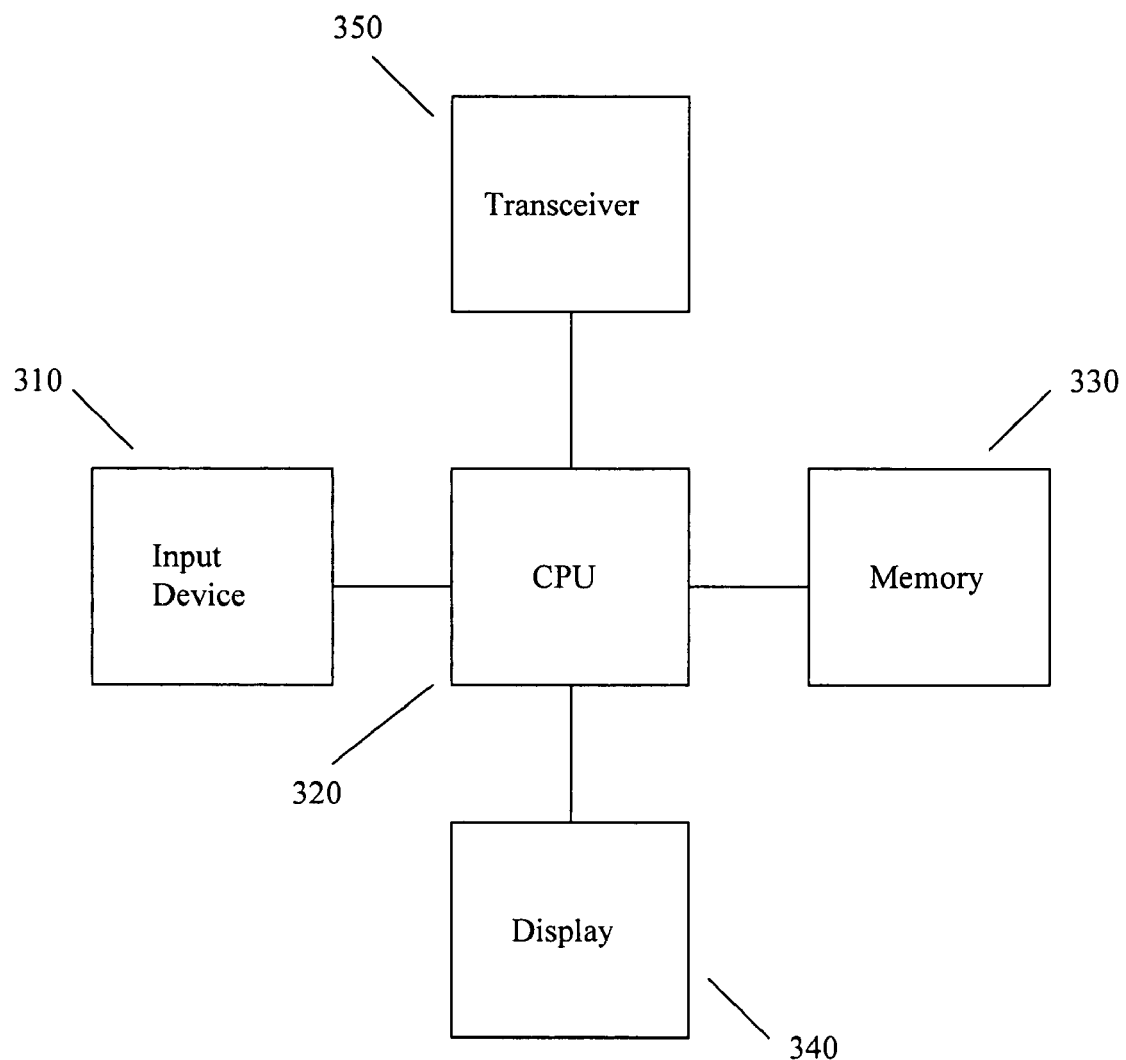
FIG. 3 is a block diagram illustrating an exemplary data processing system adapted for implementing an embodiment of the invention.

The drive/controller 250 is in wireless data communication with a remote data processing system 300 (see FIG. 3). This wireless data communication is supported by a first transceiver 290 mounted on the stage 210 and coupled to or incorporated in the driver/controller 250 and a second transceiver 350 (see FIG. 3) associated with the data processing system 300. The transceivers can include radio frequency ("RF"), infrared ("IR"), and power-line carrier (high frequency modulation) transceivers and various communication protocols can be supported including the Bluetooth, wireless local area network ("LAN"), and asymmetric digital subscriber line ("ADSL") protocols.

Figure 4:
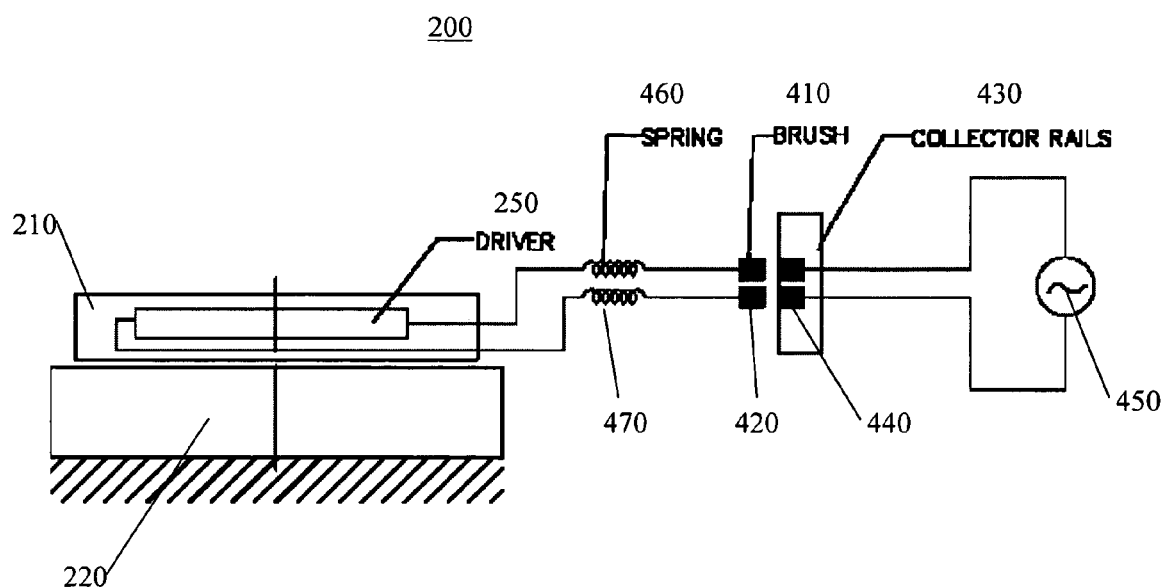
FIG. 4 is a schematic diagram illustrating a linear motor having its driver/controller powered through brushes and collector rails in accordance with an embodiment of the invention.

FIG. 4 is a schematic diagram illustrating a linear motor 200 having its driver/controller 250 powered through brushes and collector rails in accordance with an embodiment of the invention. The driver/controller 250 receives electrical power from a power source 450 through power or collector rails 430, 440 mounted on the frame 220 which are in contact with brushes 410, 420 mounted on the stage 210. The power or collector rails 430, 440 may be linear guides 510, 520 (see FIG. 5). To improve conductance, the brushes may be mounted on springs 460, 470. On the stage 210, power from the brushes 410, 420 is distributed to the driver/controller 250 and other stage mounted devices. Similarly, a collector ring arrangement (not shown) typical of subway trains and the like may be used to supply power to the stage 210.

Figure 5:
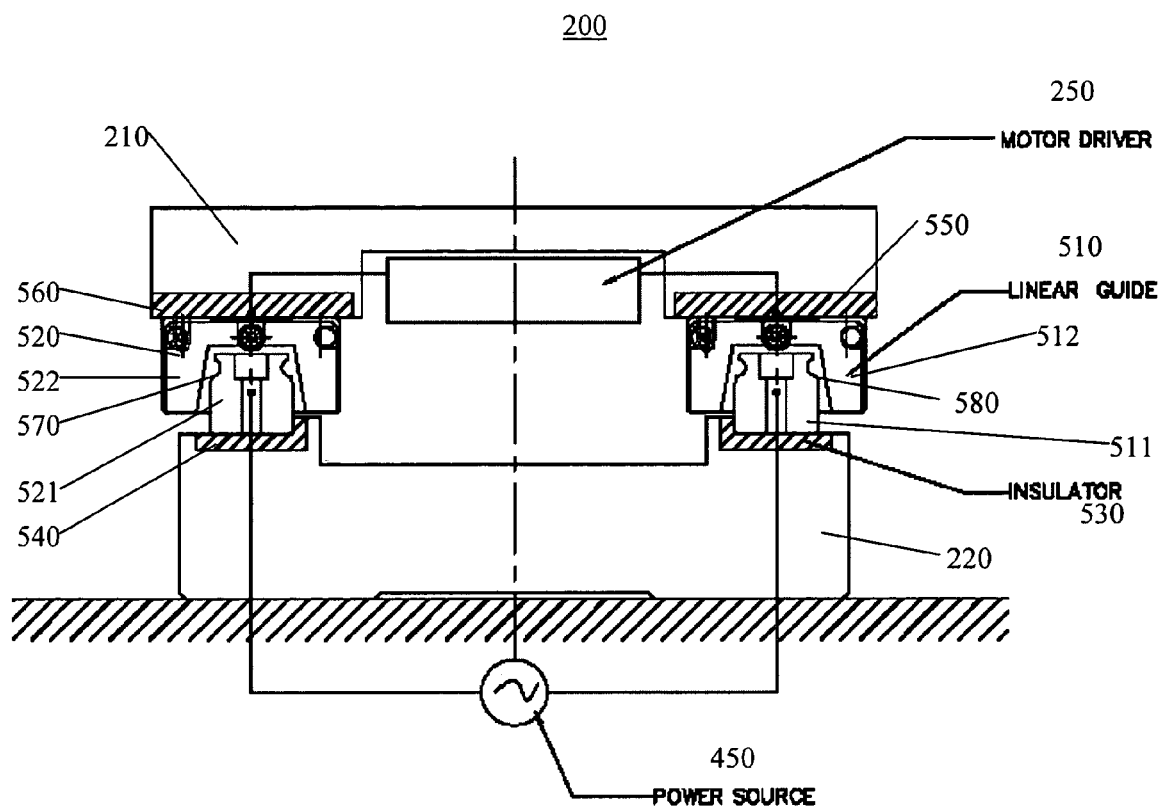
FIG. 5 is a front view of a linear motor having its driver/controller powered through insulated linear guides in accordance with an embodiment of the invention.

FIG. 5 is a front view of a linear motor 200 having its driver/controller 250 powered through insulated linear guides 510, 520 in accordance with an embodiment of the invention. In this embodiment, the rail or frame portion 511, 521 of each linear guide 510, 520 is connected to the power source 450. The rail or frame portion 511, 521 is generally insulated from the frame 220 by first insulators 530, 540. The stage portion 512, 522 of each linear guide 510, 520 is connected to the stage 210 upon which is mounted the driver/controller 250. The stage portion 512, 522 is generally insulated from the stage 210 by second insulators 550, 560. The insulated linear guides 510, 520 function to both support and provide power to the stage 210. Ball bearings 570, 580 provide the points of electrical contact between the rail or frame 511, 521 and stage 512, 522 portions of the linear guides 510, 520.

Figure 6A:
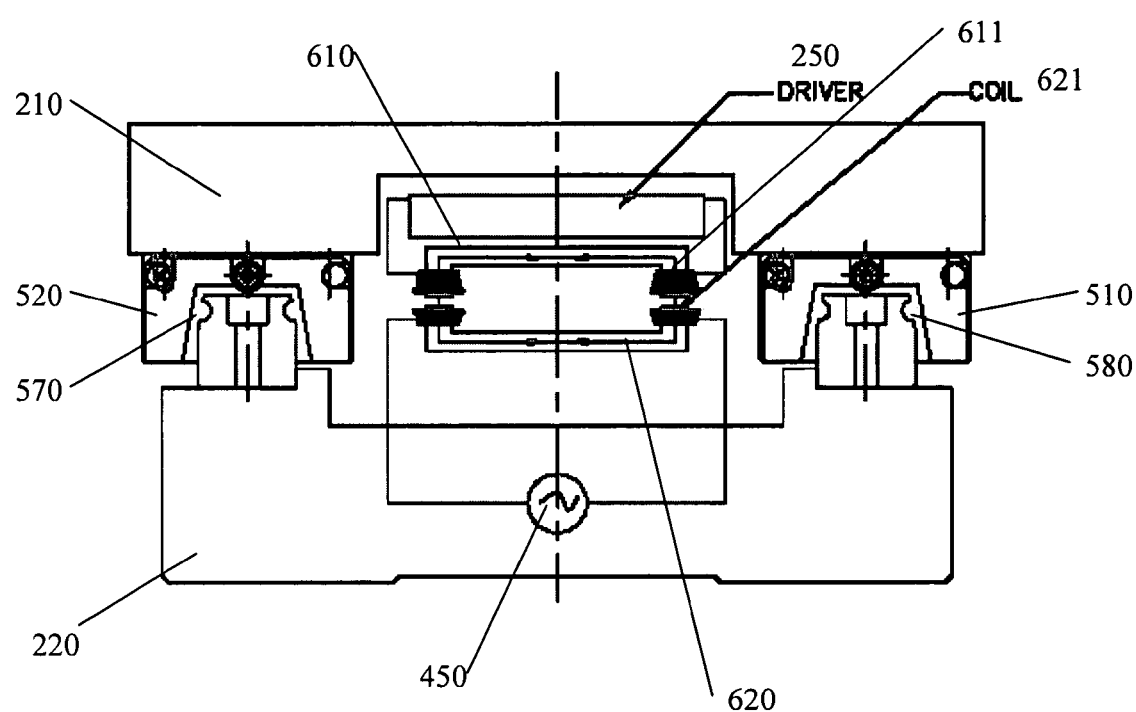
FIG. 6A is a front view of a linear motor having its driver/controller powered by magnetic induction in accordance with an embodiment of the invention; and, FIG. 6B is a perspective view of the coils and cores for use in the embodiment of FIG. 6A in accordance with an embodiment of the invention.
Figure 6B:
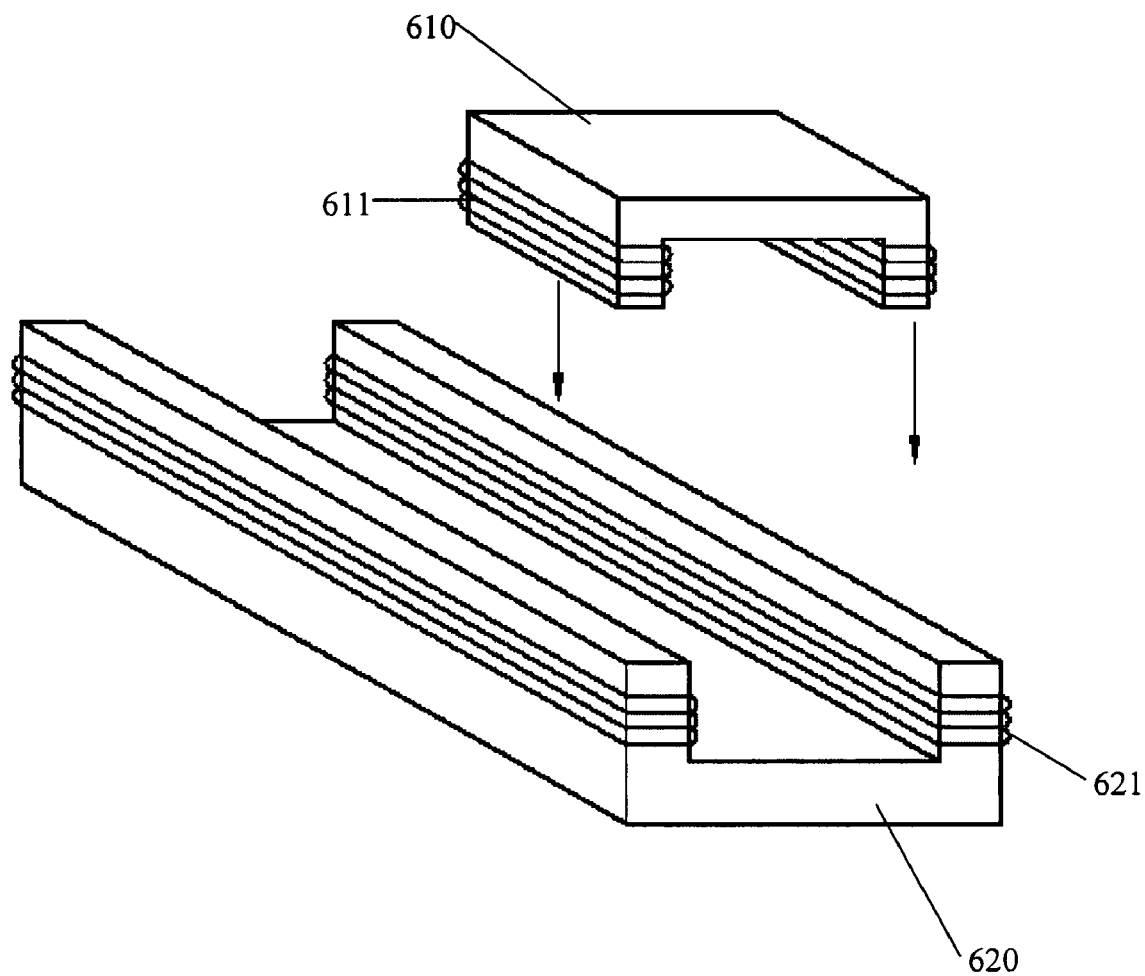

FIG. 6A is a front view of a linear motor 200 having its driver/controller 250 powered by magnetic induction in accordance with an embodiment of the invention; and, FIG. 6B is a perspective view of the coils 611, 621 and cores 610, 620 for use in the embodiment of FIG. 6A in accordance with an embodiment of the invention. In this embodiment, the stage 210 and frame 220 have associated coils 611, 621 wound on respective cores 610, 620. The rail or frame coil 621 is connected to a power source 450. When energized, the frame coil 621 causes a magnetic flux to link the stage core 610 and coil 611 and hence induce a voltage across the stage coil terminals. The stage coil terminals are connected to the driver/controller 250 and provide it with electric power. The stage and frame coils 611, 621 and cores 610, 620 may be integrated with the linear guides 510, 520 and/or stage 210 and frame 220.

According to another embodiment of the invention, the stage 210 may be powered by a rechargeable battery (not shown) alone or with a rechargeable battery in combination with one or more of the linear guide based power delivery means described above.

Referring again to FIG. 2, the stage 210 generally includes a metal or cast resin armature plate (not shown) in which the armature coils 230 are embedded. For a three phase motor, typically six coils are used three of which are shown in FIG. 2, in a non-overlapping arrangement, but, as will be appreciated by those skilled in the art, they could be disposed in an overlapping position. The armature plate is formed with a suitable thermally conductive metal or resin. A heat sink (not shown), made of a suitable thermally conductive material (e.g. aluminium) is attached by a heat conductive epoxy to the armature plate. Thermally conductive pins (not shown) can be used to help conduct heat from the armature coils 230 to the heat sink and also help secure the heat sink to the armature plate. One or more fans (not shown) can be attached to the heat sink to move air across the heat sink to help cool it and thereby aid in heat transfer away from the armature coils 230. The heat sink typically includes fins (not shown) to aid in heat removal by providing an additional surface area over which air may pass. The linear guides 510, 520 are also effective in transferring heat from the stage 210 to the frame 220 by conduction.

Sensors 270 (e.g. Hall Effect sensors), attached to the stage 210, generate commutating signals indicating the position of the armature coils 230 relative to the stator permanent magnets 240. As will be appreciated by those skilled in the art, these commutating signals are used to control sequential switching of power to the armature coils 230 by the driver/controller 250. In a three-phase embodiment of the invention, three commutation position sensors 270 (e.g. three Hall Effect sensors) may be used. In addition, an armature position encoding sensor 280 is attached to stage 210. The armature position encoder 280 may be, for example, an optical encoder. The use of Hall Effect sensors 270 is optional.

Commutation signals from the sensors 270 and armature position signals from the armature position encoder 280 are coupled to the driver/controller 250. The armature position signals, which indicate the position of the stage 210, and the commutation signals, are decoded as necessary by the driver/controller 250 and used to control the supply of power to the armature coils 230. Alternatively or additionally, the armature position and commutation signals may be received by the driver/controller 250 and transmitted via the coupled stage mounted transceiver 290 to the data processing system 300.

FIG. 3 is a block diagram of an exemplary data processing system 300 adapted for implementing an embodiment of the invention. The data processing system is suitable for controlling and/or monitoring one or more integrated linear motors 200 in conjunction with a graphical user interface ("GUI"). The data processing system 300 includes an input device 310, a central processing unit or CPU 320, memory 330, a display 340, and a transceiver 350. The input device 310 may include a keyboard, mouse, trackball, or similar device. The CPU 320 may include dedicated coprocessors and memory devices. The memory 330 may include RAM, ROM, databases, or disk devices. The display 340 may include a computer screen or terminal device. And, the transceiver 350 may include RF, IR, and power-line carrier transceivers. The data processing system 300 has stored therein data representing sequences of instructions which when executed cause the operations described herein to be performed. Of course, the data processing system 300 may contain additional software and hardware a description of which is not necessary for understanding the invention.

In operation, the driver/controller 250 receives an instruction set from the data processing system 300 via the stage mounted transceiver 290 and data processing system transceiver 350. The instruction set specifies the position or path the stage 210 is to move to or over, respectively. The driver/controller 250 receives position and commutation signals from the position and commutation sensors 270, 280, respectively. From the received position signals, commutation signals, and instructions, the driver/controller 250 computes the drive signals to be provided to the armature coils 230 to complete the repositioning or movement specified by the instruction set. Using power provided by the frame mounted power rail, for example, the driver/controller 250 generates the necessary drive signals and provides these to the armature coils 230. The driver/controller 250 continues to monitor the position and commutation sensors 270, 280 during movement of the stage 210. After the stage 210 has been repositioned or moved in accordance with the instruction set, the driver/controller 250 reports instruction set completion and the new location of the stage 210 to the data processing system 300 and awaits a new instruction set. The driver/controller 210 may continually report stage position and other parameters (e.g. power consumption, temperature, etc.) to the data processing system 300 or these parameters may be reported upon request by the data processing system 300.

The sequences of instructions which when executed cause the operations described herein to be performed by the driver/controller 250 and/or data processing system 300 can be contained in a data carrier product according to an embodiment of the invention. This data carrier product can be loaded into and run by the driver/controller 250 and/or data processing system 300. In addition, the sequences of instructions which when executed cause the operations described herein to be performed by the driver/controller 250 and/or data processing system 300 can be contained in a computer software product according to an embodiment of the invention. This computer software product can be loaded into and run by the driver/controller 250 and/or data processing system 300. Furthermore, The sequences of instructions which when executed cause the operations described herein to be performed by the driver/controller 250 and/or data processing system 300 can be contained in an integrated circuit product including a coprocessor or memory according to an embodiment of the invention. This integrated circuit product can be installed in the driver/controller 250 and/or data processing system 300.

Advantageously, no umbilical wires 190 are used to connect the stage 210 or driver/controller 250 to the frame 220 or data processing system 300. In addition, the linear guides 510, 520 facilitate effective heat dissipation from the stage 210 while providing improved power transfer to the stage 210.

Although preferred embodiments of the invention have been described herein, it will be understood by those skilled in the art that variations may be made thereto without departing from the spirit of the invention or the scope of the appended claims.

What is claimed is:

1. A wireless linear motor comprising:
   a stationary stator having permanent magnets;
   a movable stage having coils and a controller with a transceiver for wirelessly communicating with an external data processing system, the controller adapted to energize the coils to position the stage over the stator in response to control signals from the external system; and,
   a frame having first and second magnetically permeable linear guides for slideably mounting the stage over the stator to form a magnetic circuit linking the frame and stage, wherein each linear guide has a stage portion attached to the stage and wound with a stage coil, a frame portion attached to the frame and wound with a frame coil, a plurality of ball bearings disposed between and magnetically coupling the stage and frame portions, electric conductors coupling the frame coil to an external power supply for generating a magnetic flux in the frame portion, and additional electric conductors coupling the stage coil to the controller for providing electrical power induced in the stage coil by the magnetic flux.

2. The wireless linear motor of claim 1 wherein the stator is incorporated in the frame.

3. The wireless linear motor of claim 1 wherein a linear recess is defined in the stage portion for receiving the frame portion.

4. The wireless linear motor of claim 1 and farther comprising position sensors coupled to the controller for providing position signals for the stage to the external system for generating the control signals.

5. The wireless linear motor of claim 1 and further comprising magnetic sensors mounted on the stage and coupled to the controller for providing magnetic pole signals indicative of the location of the stage relative to the permanent magnets of the stator.

6. The wireless linear motor of claim 5 wherein the magnetic sensors are Hall Effect sensors.

7. The wireless linear motor of claim 1 and further comprising a battery mounted on the stage and coupled to the controller for delivering supplemental power to the controller.

8. A power supply circuit for a linear motor, the motor having a stationary stator including permanent magnets, a movable stage including coils and a controller for communicating with an external data processing system and adapted to energize the coils to position the movable stage over the stationary stator in response to control signals from the external system, the circuit comprising:

first and second magnetically permeable linear guides mounted on a frame and for slideably mounting the stage over the stator to form a magnetic circuit linking the frame and stage, wherein each linear guide has a stage portion attached to the stage and wound with a stage coil, a frame portion attached to the frame and wound with a frame coil, a plurality of ball bearings disposed between and magnetically coupling the stage and frame portions, electric conductors coupling the frame coil to an external power supply for generating a magnetic flux in the frame portion, and additional electric conductors coupling the stage coil to the controller for providing electrical power induced in the stage coil by the magnetic flux.

9. The power supply circuit of claim 8 and further comprising a battery mounted on the stage and coupled to the controller for delivering supplemental power to the controller.

* * * * *